United States Patent Office 3,511,706
Patented May 12, 1970

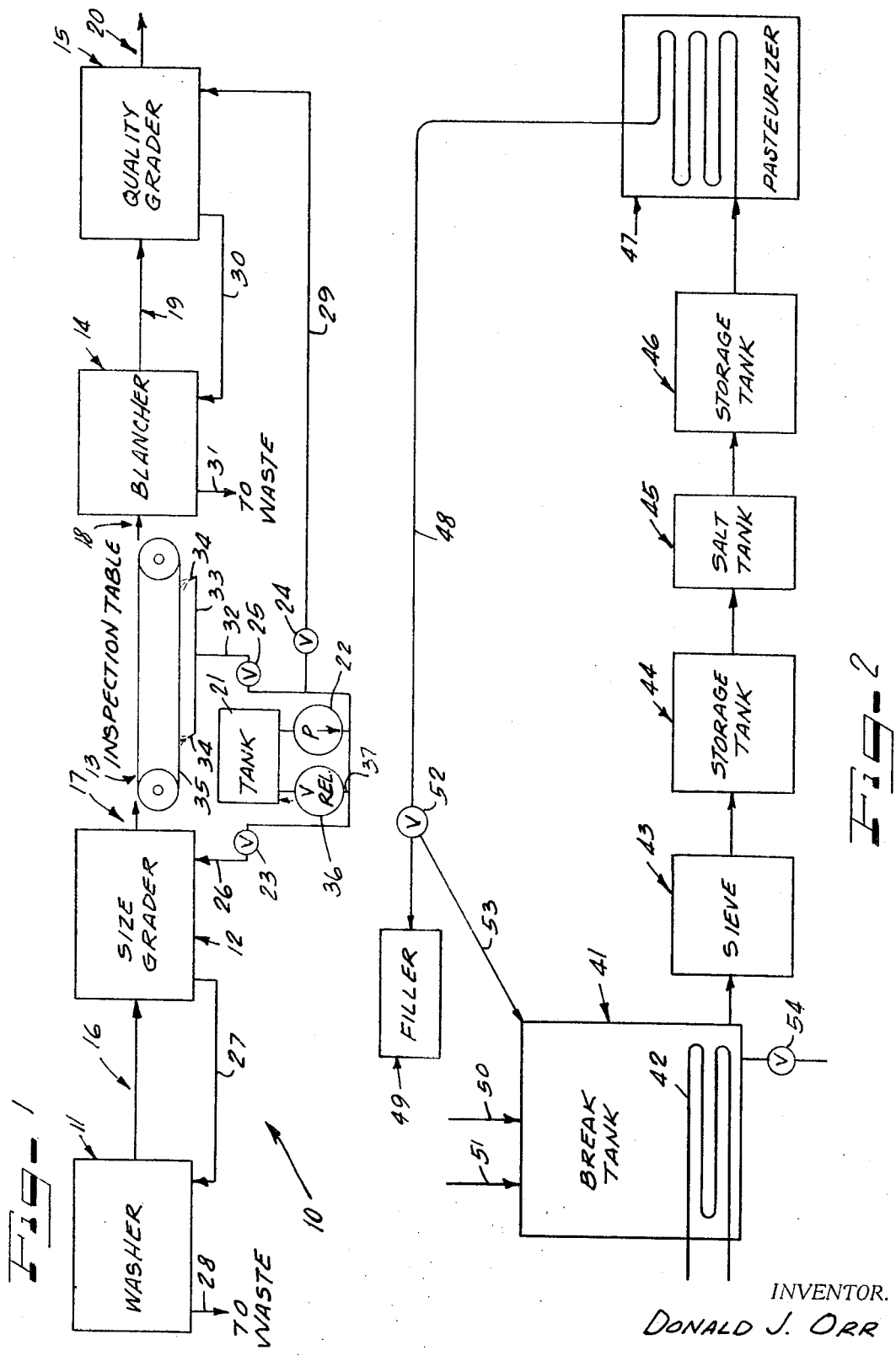

3,511,706
METHOD OF CLEANING AND SANITIZING FOOD PROCESSING DEVICES
Donald J. Orr, 952 14th Ave. SW.,
Rochester, Mich. 48063
Filed May 11, 1967, Ser. No. 637,676
Int. Cl. B08b 9/00, 9/02
U.S. Cl. 134—23              6 Claims

ABSTRACT OF THE DISCLOSURE

A cleaning method for a series of food processing devices consisting of preparing a cleaning solution of proper concentration and temperature at a central location and passing the solution through the series of devices one after another and then passing a sanitizing solution through the devices. The method further includes utilizing thermo-shock treatment to remove baked or burned on contaminations from the devices.

BACKGROUND OF THE INVENTION

Field of the invention

This invention pertains to a method of cleaning and sanitizing a series of food processing devices.

Prior art

For years processors in the canned and frozen food industry have experienced and accepted spoilage losses amounting to approximately two to three percent of the plant's output. These losses in an average size plant would result in an annual loss of twenty to thirty thousand dollars, not to mention the loss of prestige and good will for the product of the canned or frozen food producers.

Spoilage in canned and frozen foods is due to the presence of bacteria which were not killed during the preparation and packaging of the food product. Bacteria are present on the raw food as it enters the food processing plant and are usually removed and/or destroyed during the processing of the raw food to the final product. Since most of the food processing devices provide some of the conditions for rapid bacteria growth, the presence of an accumulation of dirt containing starches and carbohydrates in any of these devices completes the necessary conditions for rapid growth in the number of the bacteria. An example of such a device is the blancher which if dirty, has the ideal moisture, temperature and food conditions for bacteria reproduction. Therefore a dirty food processing device will increase the number of bacteria in the food being processed, and this increase in the number of bacteria will cause an increase in the chance of spoilage in the final product.

Food processors have tried to minimize spoilage by cleaning the various food processing devices. At the present time, each device is individually cleaned by manual labor using the following procedure: of removing the food from the device, adding water, adding some cleaning compound, heating the water while it is in the device, and operating the device to bring the cleaning solution into contact with the surfaces in this device. The above procedure for cleaning has many faults since the concentration of the cleaning solution, the temperature of the cleaning solution, and the amount of contact with the device are each individually determined at each device and usually show a great variation from one device to the next.

In order to effectively clean a food processing device, three important elements must be present; proper concentration of the cleaning solution, proper temperature for the cleaning solution, and proper contact of the surfaces of the device by the cleaning solution. In the above described manual procedure for cleaning there is a wide variation in the concentration of the cleaning solution, in the temperature of the cleaning solution and in the contact of the solution with the surfaces of the device. Furthermore, the manual method of individually cleaning each of the food processing devices requires a considerable number of man-hours which in the canning and/or frozen food industry, would involve a considerable amount of down time during the food processing season. This down time reduces the total output of the plant.

In certain food preparation steps or process such as cooking corn, or making tomato juice, an additional problem occurs because the tomato juice or the starchy liquids from the corn will bake or burn on the heating coils in the cooking tanks or break tanks. At the present time, these coils are cleaned by removing the food from the tank and sending men into the tank to manually scrape or brush this accumulation of burned-on contamination from the coils. This present method is both time consuming and has caused foreign particles such as wires from the brushes or pieces of metal to be left in the tank to contaiminate any of the food that is later prepared in the device.

To minimize the presence of bacteria in the various devices used in the food processing plant, the food processors have also tried to kill the bacteria by using a sanitizing solution containing chlorine. If the device is dirty or laden with starches and carbohydrates from the food being processed therein, the effectiveness of the sanitizing solution is very slight since it will only kill those baceteria in which it comes in contact. A sanitizing solution is only effective in killing the bacteria when used in a device which is clean.

In a food processing plant there are also many surfaces which come in contact with the food but which cannot be cleaned by being submerged in a cleaning solution, for example, moving parts such as inspection belts and food choppers. At the present time, these devices are cleaned by spraying a cleaning solution on the moving parts. The spraying is usually controlled by the operator who adjusts the temperature and the concentration of the fluid being sprayed upon the part. As in the individual cleaning of the food processing devices, this manual adjustment by the operator produces a great variety of temperatures, concentration and contact time and thus does not always give a satisfactory result.

When individually cleaning a food processing device, the cleaning power of the solution used is not completely utilized during the cleaning of just a single device. Under present practices, the solution is dumped or discharged from the device into a waste system after the cleaning operation is completed. Since this dumped solution still has a considerable amount of cleaning power left, the present practice of cleaning food processing devices is wasteful and economically inefficient.

SUMMARY OF THE INVENTION

This invention entails a method for cleaning and sanitizing a series of food processing devices for fresh vegetables or fresh fruit which comprises making up a cleaning solution in a tank to the proper and desired concentration, heating the solution to the desired temperature, transferring the prepared solution to a food processing device, circulating it therethrough to clean the device, then passing the solution from that device to a next device to clean the second device and continuing to pass the solution to subsequent devices until it is desirable to dump the solution into a waste system. The method also includes utilizing thermoshock treatments during the cleaning of a cooking vessel to remove the baked on contaminations. The invention further contemplates utilizing the prepared solution for spraying moving parts of the food processing devices which cannot be cleaned by total submersion. The method further includes a final step of preparing a sanitizing solution in the tank to be passed through the previous cleaned devices and sprayed on the moving parts to kill any bacteria that may still be remaining.

Accordingly, it is an object of the present invention to provide a method in which the concentration, temperature, and contact of the cleaning solution for food processing devices is standardized and controlled.

Another object of the present invention is to provide a method for cleaning food processing devices which will reduce the man hours and down time required for cleaning the devices.

A still further object of this invention is to provide a method of cleaning food processing devices which will greatly minimize the presence of bacteria in these devices and greatly reduce the spoilage due to bacteria in the food processed by these devices.

Yet another object of the present invention is to provide a method for cleaning break tanks or cooking vessels at a reduced amount of down time and manpower.

A still further object of the present invention is to provide a method for cleaning food processing devices in which the cleaning solution is utilized to clean more than one device.

Many other advantages, features and additional objects of the present invention will become manifest to those versed in the art upon making reference to the detailed description and the accompanying sheet of drawings in which the preferred method embodying the principle of the present invention is described.

ON THE DRAWINGS

FIG. 1 is a diagrammatic representation of some of the food processing devices utilized in a typical food processing plant and illustrates diagrammatically the process for cleaning these devices.

FIG. 2 is a partial diagrammatic representation of a break tank and connection to a pasteurizer and illustrates the circulation of the cleaning fluids to cleanse these devices.

AS SHOWN IN THE DRAWINGS

The principles of this invention are particularly useful to clean and sanitize a food processing line 10 illustrated by the diagram of FIG. 1.

The food processing line 10 as illustrated comprises a washer, generally indicated by the numeral 11, a size grader, generally indicated by the numeral 12, inspection tables, generally indicated by the numeral 13, a blancher, generally indicated by the numeral 14, and a quality grader, generally indicated by the numeral 15. The washer 11 is used to clean the food being processed and removes the dirt, dust and other bits of foreign particles which may be present in the food as it is brought to the food processing plant.

After being washed, the food is then conveyed to the size grader 12 by product lines, generally indicated by the numeral 16, which may consist of a series of pumps, pipes or flumes to carry the food while it is suspended in a liquid medium. The size grader will grade the food product which may be peas, corn or beans, as to the size and then discharge them through a conveying means generally, indicated by the numeral 17, to the inspection tables 13. The conveying means 17 may consist of a de-watering device which will remove the liquid in which the food had been carried.

At the inspection tables 13, the food is inspected and spoiled, discolored or damaged pieces are removed as the food is carried along on moving belts which are usually rubber but in some cases may be metal. After being inspected, the food is then transferred by a product line, generally indicated by the numeral 18, to the blancher 14.

At the blancher 14 the food is blanched and then conveyed by a food product line, generally indicated by the numeral 19, to a quality grader 15 in which the food is graded according to quality. From the quality grader 15 the food is then conveyed by product line 20 to further processing equipment which may be cookers, fillers, or choppers and ultimately to the canning or freezing equipment.

The food devices shown in FIG. 1 are not necessarily conclusive of those devices that would be present at a food processing plant, but are merely mentioned to illustrate the various types of devices in which the food product such as a fresh vegetable or a fresh fruit will travel through while being processed from the raw state to a condition ready to be canned or packaged as frozen food. Each one of these particular devices will become dirty during the normal days of operation. Some due to their nature are dirtier than others, for example, the blancher which heats the food product to a high temperature has a large accumulation after a day's operation of carbohydrates and starches. These starches and carbohydrates provide an excellent breeding ground for bacteria, especially since the blancher also provides a moist and hot environment.

To perform the method of cleaning and sanitizing this representative food processing line, the following equipment is necessary. A tank, generally indicated by the numeral 21, in which the cleaning solution is prepared and heated, a pump, generally indicated by the numeral 22, for transferring the solution to the various food processing devices and the valves 23, 24 and 25 which control the flow of the cleaning solution to the food processing devices. As illustrated, a line 26 from the valve 23 connects the size grader 12 to the tank 21. An additional line 27 connects the size grader to the washer 11, or it may connect the size grader 12 to the product line 16 adjacent to the washer 11. A line 28 connects the washer 11 to a waste system.

A line 29 connects the quality grader 15 through the valve 24 to the tank 21 so that the solution may be transferred from the tank to the quality grader. The quality grader 15 is connected to the blancher 14 or to the product line 19 adjacent the blancher 14 by a line 30 and finally the blancher is connected to a waste system by a line 31. The valve 25 is connected by line 32 to a spray manifold 33 which has spray nozzles 34, 34 for cleaning the inspection table belts 35.

In addition to the above mentioned valves and lines, a pressure relief valve 36 and return line 37 are connected between the pump 22 and valves 23, 24 and 25. The check valve 36 has the dual function of preventing damage to pump 22 if all of the valves 23 to 25 are closed, and providing a means of mixing the contents of tank 21 by passing the fluid through the pump 22 and back into the tank by line 37.

As may be seen from FIG. 1, the lines for the transfer of the cleaning solution go to the relatively cleanest devices first and then convey the cleaning solution to the dirtier devices. The purpose of this type of hook-up is to prevent the cleaning solution from carrying a large amount of dirt and foreign matter from one apparatus to the next. For example, if the solution went to the blancher 14 first, it would have a greater amount of dirt to be carried through the other devices. By the present hook-up the great amount of dirt removed from the blancher is carried directly to the waste system.

The method of cleaning the processing line is accomplished in the following manner: A cleaning solution of the desired concentration is made up in the tank 21, mixed, and heated to the desired temperature. This solution is then pumped from the tank through the valves 23 and 24 in the desired portions, part of it to the size grader 12 and part of it to the quality grader 15. The size grader and quality graders are then operated with the cleaning solution therein for a desired length of time which is approximately 20 to 30 minutes to obtain the proper contact of their surfaces by the solution.

The cleaning solution is then circulated from the size grader 12 through the line 27 to the product line 16 adjacent the washer 11 to clean this product line. It may be desirable to circulate the solution through the line 27 and the product line 16 while the size grader 12 is being cleaned; this is optional and would depend upon the amount of dirt that would be present in the size grader 12. After cleaning the size grader 12 and the product line 16, the solution is transferred to the washer 11 while the device is operated for approximately 20 to 30 minutes to clean the washer. From the washer 11, the solution is then dumped through line 28 to a waste system.

The other portion of the solution that was transferred from the tank 21 through the line 29 to the quality grader 15 either is kept in the grader while the grader is being cleaned, or may be circulated through the line 30 to a point adjacent the blancher 14 back through the product line 19 to the grader 15 to clean both the grader 15 and the product line 19. Once the product line 19 and the grader 15 are cleaned, the solution is then transferred to the blancher 14 which is in operation to obtain contact with the internal parts of the blancher and therefore clean the device. Upon completion of the cleaning of the blancher 14, the solution is then dumped through line 31 to a waste system.

If the inspection table has metal belts, a portion of the hot solution is transferred from the tank 21 through the line 32 to the spray manifold 33 and the spray nozzles 34, 34 to spray the solution on the bottom portion of the belt surface as the belt is in motion to wet and remove the various contaminations that the belt has picked up. The angle of the spray nozzles is such that the spray tends to move along the surface of the belt 35 and in the direction of the movement of the belt instead of bouncing off of the surface of the belt.

If the product line 17 and 18 comprises equipment such as dewatering devices, they cannot be cleaned as the product line 16 and 19. According to the present method of this invention, these product lines are cleaned by spraying the equipment with a hot cleaning solution as the equipment is in operation to obtain the desired contact between the solution and surfaces.

If the belt 35 is of a rubber composition, a hot cleaning is undesirable because it will cause a deterioration of this belt. In food processing lines in which the belts 35 are rubber, the method of this invention comprises an additional step of preparing a second cleaning solution in the tank 21 after the removing of the hot solution and then while the other devices such as the blancher 14 are being cleaned, pumping this cold solution through the valve 24 to the sprayers 34 to spray the moving belt 35 to remove the contaminations thereupon. It should be noted that this method reduces the number of tanks required since the hot solution is prepared first and then a cold solution is prepared in the same tank.

After all the devices and belts and product lines in the processing line have been cleaned with the cleaning solution, a third solution which is the sanitizing solution, is prepared in the tank 21. This solution is then passed through the various lines 26, 29 and 32 and circulated through the various devices and sprayed through the various spray nozzles on the equipment to kill any bacteria that is present.

As stated before, the essential elements of achieving a good cleanup of food processing equipment are having a solution of the desired concentration, having this solution at a desirable temperature, and having proper contact. It has been found that most cleaning solutions have their greatest cleaning effect in a temperature range between 150° to 180° Fahrenheit. Since the solutions will tend to have a reduced solubility at a temperature above 180° F. and start to precipitate the solids in the solution, it has been found that a good working temperature is in the range of 160° to 170° F. The cleaning solution can be prepared using any commercially available cleaning compound and water. An example is Ampolite used at a concentration of 1 oz./gal. The sanitizing solution can be made up of any commercially available chlorine base sanitizer and water and should have a concentration of approximately 25 to 100 parts per million.

To insure proper contact of the cleaning solution with the surfaces of the devices the invention relies upon a prescribed period of time for the solution to be in each device. When spraying belts and other moving parts, the volume of cleaning solution which must be passed through the nozzles to insure proper contact with the surface is calculated. By having the proper volume of cleaning solution in the tank 21 at the beginning of the spraying operation, the operator will know that the parts being sprayed have had the proper contact with the solution when the tank is emptied.

Certain food processing devices cook the food and in doing so, develop a burned-on contamination on the cooking element. FIG. 2 illustrates a portion of a food processing line in which a break tank generally indicated by the numeral 41 is present. The break tank 41 has a steam coil 42 which cooks tomatoes in a process for preparing tomato juice. After the tomatoes have been cooked and become a liquid, they are passed through a sieve, generally indicated by the numeral 43, to a storage tank indicated by the numeral 44. From the storage tank, the strained juice is passed through a salt tank generally indicated by numeral 45 to a second storage tank generally indicated by numeral 46, and then through a pasteurizer generally indicated by numeral 47. A line 48 connects the pasteurizer to a filling device, generally indicated by the numeral 49. A heating coil 42 becomes contaminated by a thick black scale formed from burning portions of the tomatoes while they are being cooked in the break tank 41.

An important part of this invention is a method for cleaning the baked-on accumulation from the heating coil 42. This is accomplished by emptying the break tank of the cooked tomato juice and while the break tank is still hot, introducing enough cold water to cover the coil 42 through a pipe 50 to chill and cause a thermoshock to break away the baked-on accumulation from break tank 41 and the heating coil 42. After letting the water sit in the tank for approximately 20 minutes to cool the tank and coil to the temperature of the cold water, the water is removed through a valve 54 to a waste system. Then a hot cleaning solution is introduced through the pipe 51 into the break tank to cause a second thermo-shock treatment to the tank and the coil 42 to break away and remove any remaining accumulation. It is desirable that the temperature of the cleaning solution be approximately 200° F. for the shock treatment. If this solution were removed from the tank, some of the removed accumulation which came into contact with the now reheated coil and tank would be rebaked on to the coil and the sides of the tank. To prevent this rebaking, additional water is added from the line 50 to lower the temperature of the solution in the break tank to approximately 160°. This solution at this temperature is allowed to stand until the tank and coils have reached this temperature. Then the cleaning solution is removed from the break tank and passed through the sieve 43, storage tanks 44, 46, salt tank 45, and pasteurizer 47 to valve 52 and returned by a line 53 to the break tank. By circulating the cleaning solution along this path several times, the break tank and the above-mentioned devices are cleaned. Finally, after the desired amount of circulation has been completed, the cleaning solution may be passed through the valve 54 to the waste system. Next, a sanitizing solution is introduced into the break tank through line 51 and circulated through the sieve 43, the storage tanks 44, 46, the salt tank 45, and the pasteurizer 47 through the line 48 and the valve 52 to the line 53 and back into the tank. This circulation is repeated for the required time to enable complete sanitation of these devices.

The method of the present invention has many advantages over the prior methods of cleaning and sanitizing food processing equipment. For example, the above-described method when tested in a plant has reduced the number of men required for plant cleanup by 50% and has reduced the time for plant cleanup by 50%. This reduction in man hours for cleanup, not only is a reduction of labor cost but also reduces the amount of down time that the plant has during the canning or freezing season. The present method for cleaning and sanitizing insures that the proper concentration for both the cleaning and the sanitizing solution is present in each device, that the solution is at the proper temperature for effective cleaning in each device, and that all surfaces of each device have proper contact with the cleaning and sanitizing solution. This will insure that each device in the food processing line is clean and has a minimum amount of bacteria present which greatly reduces the spoilage losses in the canned or frozen product.

By using the thermo-shock treatment to remove the accumulation from the break tank, the method prevents the introduction of foreign particles such as wires from brushes into the tank and thus minimizes possible contamination of the final product due to the presence of foreign particles.

All these advantages are realized by following the simple principle of preparing the cleaning solution to have the proper concentration and temperature at a central location and then transferring it to the various devices to insure that these devices received a proper contact with the cleaning solution. As pointed out, in certain instances, the principle of utilizing a thermo-shock to remove baked-on or hardened accumulation of juices or starches is utilized with the above principle of this invention.

Although minor modifications might be suggested by those versed in the art, it should be understood that I wish to embody within the scope of the patent warranted thereon all such modifications as reasonably and properly come within the scope of my contribution to the art.

I claim as my invention:
1. A method of cleaning a food processing plant for processing fresh vegetables and fruits, said plant including product lines and at least two different processing devices such as washers, graders and blanchers, said method comprising the steps of
preparing a cleaning solution of the desired concentration in a tank;
heating the prepared solution while in the tank to the desired temperature;
transferring a portion of the hot cleaning solution to the first of the devices, said first device being disposed downstream of a second device to receive the food processed therein so that the food flow during processing is from the second to the first device;
operating said first device with the hot solution therein to create a washing movement in said cleaning solution and to insure contact of the solution with all of the surfaces of said first device for cleaning thereof;
transferring said cleaning solution in the first device in a direction opposite to the food flow to the second device, said transferring including circulating the solution in and between the devices through the product lines interconnecting said devices to clean said product lines;
operating said second device with the hot solution therein to create a washing movement in said cleaning solution and to insure contact with all the surfaces of said second device for cleaning thereof; and
removing said solution from said second device.

2. A method according to claim 1, which further includes preparing a sanitizing solution in said tank and then circulating a sanitizing solution through said first device and then said second device after completing removal of the cleaning solution.

3. A method according to claim 1, in which said processing plant includes metal conveying belts, said method including the step of placing the metal belts in motion and spraying the remaining portion of hot cleaning solution in said tank on said moving belts to clean said belts.

4. A method according to claim 3, in which said processing plant further includes rubber conveying belts, said method further including preparing a second portion of cleaning solution in said tank after said remaining portion of hot cleaning solution has been removed therefrom, placing said rubber belts in motion, and spraying said rubber belts with said second portion of cleaning solution to clean said belts.

5. A method according to claim 4, in which said spraying of both the metal and rubber belts is done with the stream of said spray being directed at an angle to said belts and in the direction of said belts travel so that a maximum wetting and cleaning of said belts is accomplished.

6. A method according to claim 4, which further includes preparing a sanitizing solution in said tank after said second portion of cleaning solution has been removed, and then circulating a portion of said sanitizing solution through said first device and then through said second device while spraying the remainder of said sanitizing solution on said belts to kill any bacteria present in said devices and said belts.

References Cited
UNITED STATES PATENTS

| | | | |
|---|---|---|---|
| 2,770,248 | 11/1956 | Audia. | |
| 2,817,606 | 12/1957 | Barrett | 134—22 |
| 2,818,076 | 12/1957 | Erling. | |
| 2,916,406 | 12/1959 | Bulatkin | 134—22 |
| 3,042,533 | 7/1962 | McConnell et al. | 21—58 X |
| 3,058,853 | 10/1962 | Wurzburg et al. | 21—58 X |

FOREIGN PATENTS

| | | |
|---|---|---|
| 869,870 | 6/1961 | Great Britain. |
| 957,904 | 5/1964 | Great Britain. |

MORRIS O. WOLK, Primary Examiner

B. S. RICHMAN, Assistant Examiner

U.S. Cl. X.R.

21—58; 134—17, 22, 26, 32, 34